United States Patent [19]
Sugiyama

[11] Patent Number: 6,118,941
[45] Date of Patent: Sep. 12, 2000

[54] LENS-FITTED FILM UNIT WITH EASILY TORN EXTERNAL MEMBER

[75] Inventor: Nobuaki Sugiyama, Hino, Japan

[73] Assignee: Konica Corporation, Japan

[21] Appl. No.: 09/076,141

[22] Filed: May 11, 1998

[30] Foreign Application Priority Data

May 16, 1997 [JP] Japan .................................. 9-127228

[51] Int. Cl.[7] .................................................. G03B 17/02
[52] U.S. Cl. .............................................. 396/6; 396/535
[58] Field of Search ................................ 396/6, 535, 541

[56] References Cited

U.S. PATENT DOCUMENTS 3,906,535  9/1975  Takahama et al. .
4,420,240  12/1983  Katsuma et al. .
5,329,330  7/1994  Sakai et al. .
5,581,321  12/1996  Boyd ........................................ 396/535
5,752,087  5/1998  Sangregory .................................. 396/6
5,784,652  7/1998  Schroder et al. ................... 396/541 X
5,864,717  1/1999  Lermann et al. ............................ 396/6

OTHER PUBLICATIONS

Eurpean Search Report EP 98 10 8569, Aug. 27, 1998.

*Primary Examiner*—Howard B. Blankenship
*Attorney, Agent, or Firm*—Jordan B. Bierman; Bierman, Muserlian and Lucas

[57] ABSTRACT

A lens-fitted film unit includes: a first member for constituting an external surface of the lens-fitted film unit; a second member for constituting the external surface together with the first member; and an external member adhered to at least a part of the first or second member so that at least one portion of a boundary portion of the first and second members is covered. A direction in which the external member is easily torn, is a direction intersecting with the boundary portion of the first and second members.

6 Claims, 3 Drawing Sheets

LENS-FITTED FILM UNIT WITH EASILY TORN EXTERNAL MEMBER

BACKGROUND OF THE INVENTION

The present invention relates to a lens-fitted film unit onto which an external member is adhered which covers a boundary portion of the first member and the second member constituting the external surface.

In the conventional lens-fitted film unit, there is a lens-fitted film unit which has the first member and the second member constituting the external surface, and for example, a unit main body housing a mechanical member is covered by a front cover and a rear cover. In such the lens-fitted film unit, it is further covered by a paper made external member bent at the position of a ridgeline of the front cover and the rear cover. This paper made external member covers an unseemly portion of an appearance of the front cover and the rear cover, and a trade name, a simple explanation for use, or the like, is written on it.

A lens-fitted film unit is conventionally known in which an engaging claw is provided on any one side of the front cover and the rear cover, the front cover and the unit main body, or the rear cover and the unit main body, and an engaging hole is provided on the other side so that the front cover and the rear cover are fitted.

Further, as an external member, other than the paper made external member, a label-like external member is also known which is adhered to the front cover or the rear cover. Further, there also be a case in which, in order to reinforce the connection of the front cover and the rear cover, the external member is adhered so that the boundary portion of the front cover and the rear cover is covered. In this case, the external member has a function to make the appearance attractive, and a function to reinforce the connection of the front cover and the rear cover.

However, in the case where the lens-fitted film unit is dropped, there is a problem in which the external member is broken near the boundary portion of the front cover and the rear cover, and after that, the connection of the front cover and the rear cover is not reinforced by the external backing body.

As the result of various consideration, the following is found: in the external member, there is an external member in which a crack or tear is caused independently of its direction, and an external member having a direction in which it is easily cracked or torn, and a direction in which it is hardly cracked or torn depending on the direction. Further, it is found that the crack or tear is easily caused on the external member when it is dropped, in the case where the direction in which it is easily cracked or torn coincides with the direction of the boundary portion of the front cover and the rear cover. Further, when the direction in which the external member is easily cracked or torn, is crossed with the direction of the boundary portion, the crack and tear of the external member caused by dropping the lens-fitted film unit can be prevented.

The lens-fitted film unit by which the customer completes picture-taking, and which is sent to the photofinishing lab, is collected by the manufacturer and recycled. In this case, in the conventional lens-fitted film unit which is covered by the paper made external member which is bent at a position of ridgeline of the front cover and the rear cover, or by the label-like external member made of material different from the front and rear covers, the front and rear covers are made of resins, and its material is different from that of the external member, and therefore, the lens-fitted film unit can not be pulverized at recycling, and the external member is removed. However, it requires a large number of man-hours, resulting in an increase of cost. Accordingly, it is considered that the external member is formed of the same material as the front and rear covers. However, in the case where the external member is formed of polystyrene which is recently most commonly used as the material forming the front and rear covers and main body, when the lens-fitted film unit is dropped, cracking of the external member more easily occurs near the boundary portion of the front cover and the rear cover, which is a problem.

SUMMARY OF THE INVENTION

The present invention is considered in view of the foregoing problems, and the first object of the present invention is to provide a lens-fitted film unit which can prevent the crack or tear of the external member due to dropping. Further, the second object of the present invention is to provide a lens-fitted film unit in which the external member is not needed to be taken off at the time of recycling and can be pulverized together with the member constituting the external surface, and which can reduce cost and man-hours.

The above objects can be attained by any one of the following structures (1) to (5).

(1) A lens-fitted film unit comprising: the first member constituting the external surface of the lens-fitted film unit; the second member constituting the external surface of the lens-fitted film unit together with the first member; and an external member adhered to at least one portion of the first member or the second member so that at least one portion of the boundary portion of the first member and the second member is covered, wherein the direction in which the external member is easily torn, is the direction crossed with the boundary portion of the first member and the second member.

(2) The lens-fitted film unit according to Item (1), wherein the first member, the second member and the external member are formed of the same material.

(3) The lens-fitted film unit according to Item (1), wherein the direction in which the external member is easily torn, is the direction almost perpendicularly crossed with the boundary portion of the first member and the second member.

(4) The lens-fitted film unit according to Item (1), wherein the thickness of the external member is 60 μm to 80 μm.

(5) The lens-fitted film unit according to Item (1), wherein the external member is formed of polystyrene.

DETAILED DESCRIPTION OF THE PREFERRED EMBODIMENT

Figure 1:
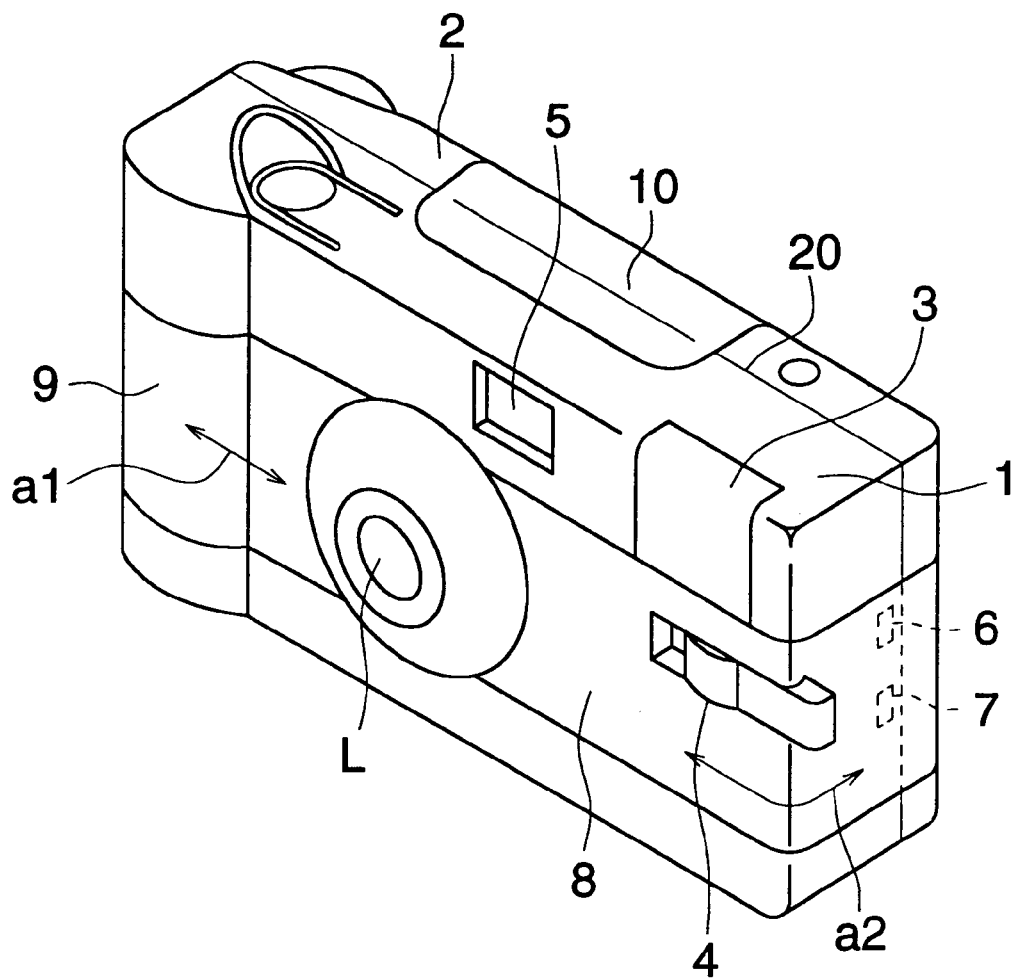
FIG. 1 is a perspective view of a lens-fitted film unit viewed from the front side.
Figure 2:
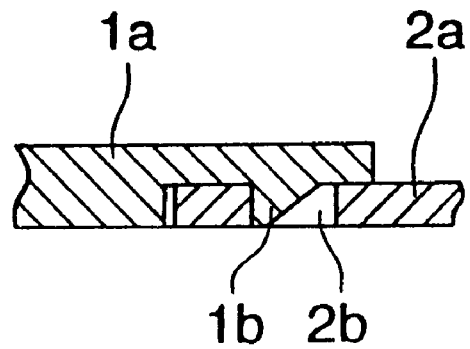
FIGS. 2(a) and 2(b) are views of an engaging portion of the front cover and the rear cover.
Figure 2:
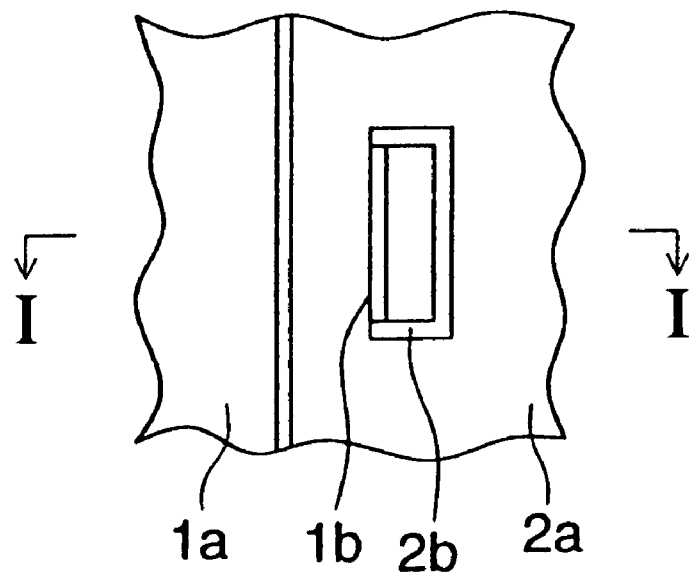
Figure 3:
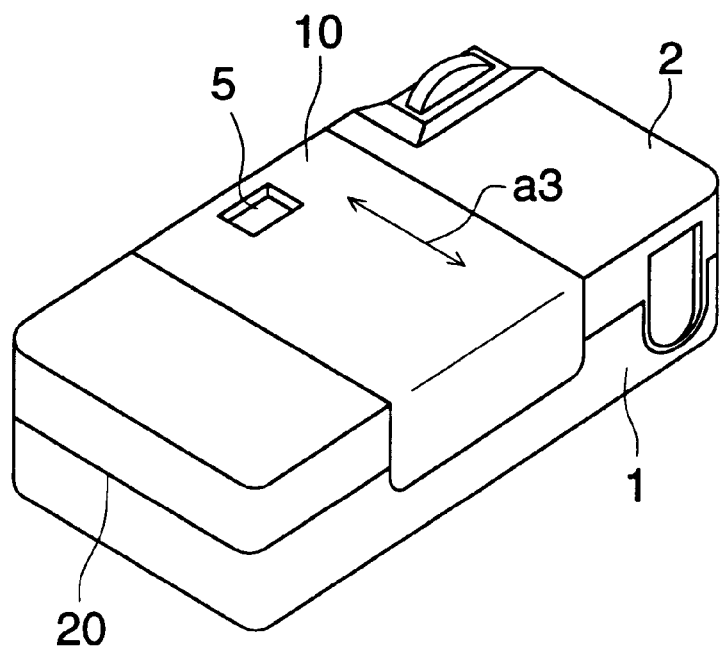
FIG. 3 is a perspective view of the lens-fitted film unit viewed from the rear side.

Referring to the drawings, an example of a lens-fitted film unit of the present invention will be described below. FIG. 1 is a perspective view of the lens-fitted film unit viewed from the front side. FIGS. 2(a) and 2(b) are views of an engaging portion of the front cover and the rear cover. FIG. 3 is a perspective view of the lens-fitted film unit viewed from the rear side.

In the drawings, numeral 1 is a front cover constituting the first member, numeral 2 is a rear cover constituting the second member, and these members cover and protect the inside mechanical members and are formed light-tightly to the previously loaded film. Thus, the front cover constituting the first member and the rear cover constituting the second member structure the external surface. Letter L is a picture-taking lens, numeral 3 is a strobe panel from which the strobe emits light, numeral 4 is a switch operation member which activates the inside power switch by being slid in the right direction, and numeral 5 is a view finder window.

The front cover 1 and the rear cover 2 engage with a unit main body, not shown in the drawing, which houses the inside mechanical members, or the front cover 1 engages with the rear cover 2, and these members are fitted as external member. In this case, these members are engaged with each other in the structure as shown by FIGS. 2(a) and 2(b) so that they can be easily assembled, and easily disassembled for recycling.

FIG. 2(a) is a sectional view viewed from I—I line in FIG. 2(b), and FIG. 2(b) is a front view of the engaging portion. In these drawings, numeral 1a is a side surface portion of the front cover 1, numeral 2a is a side surface portion of the front cover 2, an engaging claw 1b is provided on the side surface portion 1a of the front cover 1, an engaging hole 2b is provided in the side surface portion 2a of the rear cover 2, and when the engaging claw 1b is engaged with the engaging hole 2b, the side surface portion 1a of the front cover 1 and the side surface portion 2a of the rear cover 2 are held by each other. In this connection, FIG. 2(a), 2(b) are views in which the engaging claw 1b of the front cover 1 is engaged with the engaging hole 2b of the rear cover 2, however, the engaging hole may be provided in the front cover 1, and the engaging claw may be provided on the rear cover 2, or the engaging claw may be provide on either one of the front cover 1 or a unit main body, not shown, or either one of the rear cover 2 or the unit main body, and the engaging hole may be provided in the other for engagement.

As described above, when the front cover 1 is engaged with the rear cover 2, if the necessary minimum number of engaging portions can be arranged with well-balanced relationship on 4 surfaces, that is, the upper surface, bottom surface, right side surface, and left side surface of the lens-fitted film unit in which the front and rear covers are engaged with each other, there is no problem. However, for the reason of the arrangement of the inside mechanical members or design, the engaging portions are not always arranged with well-balanced relationship, and although the bottom surface has a long surface, there also be a case in which the engaging portions can not be arranged, which is a problem occurring in practice.

In FIG. 1, engaging portions 6 and 7 of the front cover 1 and the rear cover 2 are provided on the right side surface. However, there is a case in which the engaging portions 6 and 7 are not arranged on the right side surface with well balanced relationship depending on the arrangement of the inside mechanical members, not shown. Further, there also be a case in which the front cover 1 and rear cover 2 are not satisfactorily engaged with each other on the bottom surface. In this case, there is a possibility that the front cover 1 and recover 2 are disengaged from each other at the lower portion of the lens-fitted film unit by an impulse or the like. Further, when the engaging portions 6 and 7 are viewed as they are, the appearance is unseemly, therefore, they are necessary to be covered by the external member.

In the present invention, a sheet-like external member 8, formed of the same material as the front cover 1 and the rear cover 2, is adhered to the engaging portions 6 and 7 together with the front cover 1 and the rear cover 2 for covering them on the left side of the lens-fitted film unit. In the same manner, an external member 9 is adhered to also the right side of the lens-fitted film unit for covering, and further, an external member 10 is adhered to also the upper and lower sides of the lens-fitted film unit for covering. The external members 8, 9 and 10 have a function to make the appearance attractive and a function to reinforce the connection of the front cover 1 and the rear cover 2, and further, a trade name or a simple explanation for use is written thereon. In this connection, the thickness of the external member is preferably 60 $\mu$m to 80 $\mu$m, and is more preferably approximately 65 $\mu$m.

The front cover 1 and the rear cover 2 are formed of resin, and therefore, the external members 8, 9, 10 are also formed of resin which is the same material as that of covers, and it is preferable that the front cover 1, the rear cover 2 and the external members 8, 9, 10 are formed of polystyrene. When the external members 8, 9, 10 are, for example, stretching processed, there is a case in which they are easily torn in the stretching direction, and further, there is a direction in which they are easily torn depending on constituents.

Accordingly, the external members 8, 9, 10 are formed of the same material as that of the front cover 1 and the rear cover 2, and further a1, a2, and a3 which are directions in which the external members 8, 9, 10 are easily torn, are set to the direction to cross a boundary portion 20 of the front cover 1 and the rear cover 2, and the external members 8, 9, 10 are adhered. In this adhesion, adhesive agent is previously put on the external members 8, 9, 10, and they are adhered to predetermined positions of the lens-fitted film unit. As the adhesive agent, acrylic adhesive agent is used. In this connection, the direction in which the external member is easily torn, and the boundary portion may be crossed with each other, and more preferably, they are almost perpendicular to each other. Further, the direction in which the external member is easily torn, may be a direction in which the external member is easily torn by hands, or more accurately, it may be a direction in which the external member is torn when the tear test regulated by JIS P8116: 94 is conducted, the tear strength of the external member is measured, and the tear strength is the minimum.

As described above, the external members 8, 9 and 10 are formed of the same material as that of the front cover 1 and the rear cover 2, thereby, it is not necessary to take off the external members 8, 9 and 10 for recycling, and they can be simultaneously pulverized with the front cover 1 and the rear cover 2, so that recycling cost and man-hours can be reduced.

Further, a1, a2, and a3 which are directions in which the external members 8, 9, 10 are easily torn, are set to the direction to cross a boundary portion 20 of the front cover 1 and the rear cover 2, and the external members 8, 9, 10 are adhered, thereby, even when the lens-fitted film unit is dropped, it can be prevented that the external members 8, 9, 10 are cracked near the boundary portion of the front cover 1 and the rear cover 2. Incidentally, the external members are not necessarily made from the same material as that of the front cover 1 or the rear cover 2.

As described above, according to the present invention, the external member is formed of the same material as that of the first member and the second member, thereby, it is not necessary to take off the external member for recycling, and it can be simultaneously pulverized with the first member and the second member, so that recycling cost and man-hours can be reduced. Further, direction in which the external member is easily torn, is set to the direction to cross a boundary portion of the first member and the second member, and the external member is adhered, thereby, even when the lens-fitted film unit is dropped, it can be prevented that the external member is cracked near the boundary portion of the first member and the second member.

Further, the external member is formed of polystyrene, thereby, the crack of the external member caused by dropping the lens-fitted film unit can be positively prevented at lower cost.

What is claimed is:

1. A lens-fitted film unit comprising:
   (a) a first member constituting an external surface of said film unit;
   (b) a second member constituting said external surface with said first member and meeting said first member at a boundary;
   (c) an external member adhered to at least part of said first member or said second member and covering at least part of said boundary; said external member having a first tear strength in a first direction, said external member having a second tear strength in a second direction, said second tear strength being greater than said first tear strength and said first direction intersects said boundary.

2. The lens-fitted film unit of claim 1, wherein the first member, second member, and the external member are formed of the same material.

3. The lens-fitted film unit of claim 1, wherein thickness of the external member is 60 $\mu$m to 80 $\mu$m.

4. The lens-fitted film unit of claim 1, wherein the external member is formed of polystyrene.

5. The film unit of claim 1 wherein said first direction is substantially perpendicular to said boundary.

6. The film unit of claim 1 wherein said external member is most easily torn in said first direction.

* * * * *